J. G. EGGARS.
STANCHION.
APPLICATION FILED MAR. 29, 1911.

1,146,315.

Patented July 13, 1915.
2 SHEETS—SHEET 1.

Witnesses
O. M. Simpson
L. Dunn

Inventor
John G. Eggars
By D. Swift
Attorney

J. G. EGGARS.
STANCHION.
APPLICATION FILED MAR. 29, 1911.

1,146,315.

Patented July 13, 1915.
2 SHEETS—SHEET 2.

Witnesses
O. M. Simpson
L. Dunn

Inventor
John G. Eggars
By D. Swift & Co.
Attorney

UNITED STATES PATENT OFFICE.

JOHN GEORGE EGGARS, OF CAMPBELLSPORT, WISCONSIN.

STANCHION.

1,146,315. Specification of Letters Patent. Patented July 13, 1915.

Application filed March 29, 1911. Serial No. 617,779.

*To all whom it may concern:*

Be it known that I, JOHN G. EGGARS, a citizen of the United States, residing at Campbellsport, in the county of Fond du Lac and State of Wisconsin, have invented a new and useful Stanchion; and I do hereby declare the following to be a full, clear, and exact description of the invention, such as will enable others skilled in the art to which it appertains to make and use the same.

This invention relates to a stanchion and has for its object to provide an improved device of this character, inexpensive in its construction, durable and efficient in operation.

One of the objects of the invention is to provide an improved device of this character so constructed that the parts subjected to the greatest strain and wear will be made to stand continuous use without becoming weakened.

With these and other objects in view which will hereinafter appear, the invention consists in the novel construction and arrangement of parts hereinafter described and shown, pointed out and claimed.

Figure 1:
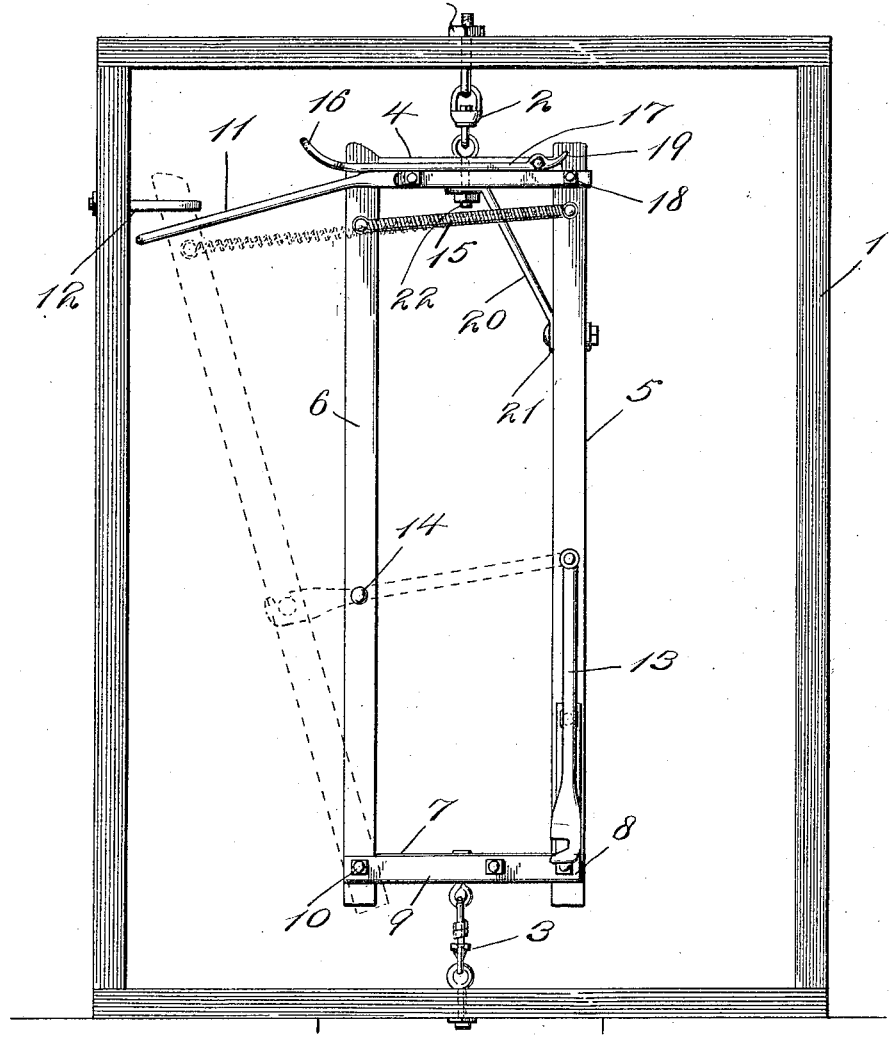
Figure 2:
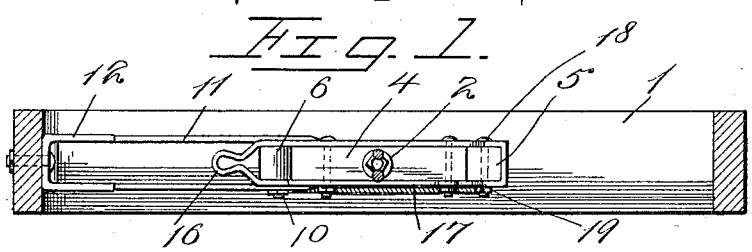
Figure 3:
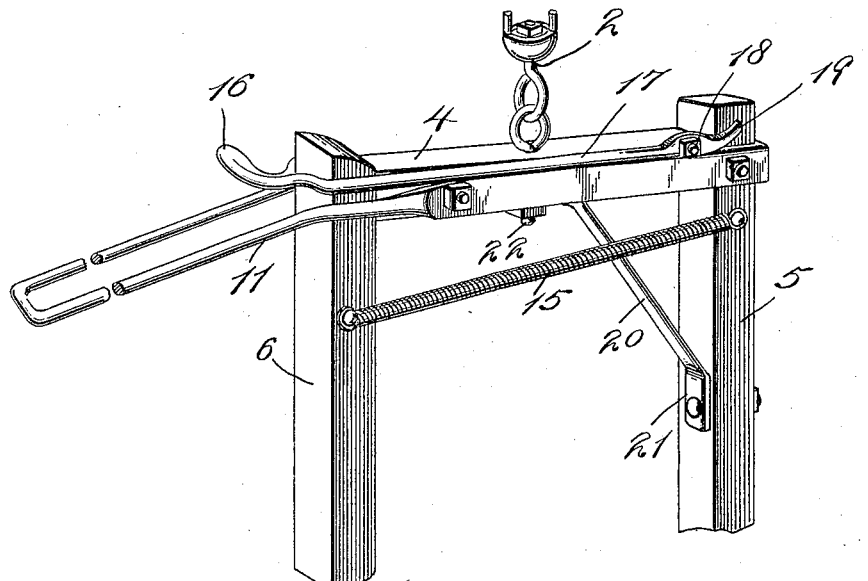
Figure 4:
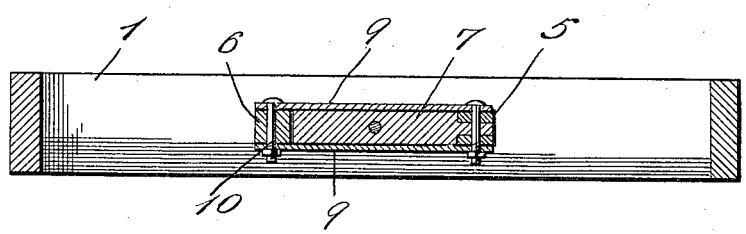

In the drawings, Figure 1 is a view in elevation of a stanchion constructed in accordance with this invention. Fig. 2 is a sectional view of Fig. 1 just above the part 4. Fig. 3 is an enlarged perspective view of the upper part of the stanchion. Fig. 4 is a longitudinal sectional view through the L-shaped plate.

Referring to the drawings, 1 designates a frame which is rectangular and which is provided with upper and lower swivel connections 2 and 3, which engage the upper and lower portions of the stanchion, said swiveled connection 2 including a nut for tightening and adjusting the same, said nut being designated by the character 3ª.

The stanchion is provided with a top 4, a rigid side 5, a movable side 6, and a bottom 7.

The rigid side 5 is provided with an L-shaped plate 8, the horizontal portion 9 of which receives the lower end of the movable side 6, which end turns on a pivot 10 which extends entirely through both of the L-shaped plates 8, one of which is disposed on each side of the stanchion.

The upper member 4 is provided with a guide 11 in which the upper end of the movable member 6 operates when it is desired to spread the same in order to receive the head of the cow or other animal to be engaged. When the movable member 6 is moved outward to its fullest limit, the same is engaged by a U-shaped member 12, which is connected to the frame 1. The U-shaped member 12 serves to hold the member 6 against movement, as will be readily understood. When the member 6 is moved outwardly, the same can be locked in that position by means of a pivoted arm 13, which engages a lug 14. As soon as the arm 13 is lowered, the movable member 6 is drawn into normal position by means of the coil spring 15. As the member 6 is drawn inwardly, it raises the upwardly curved portion 16 of the locking member 17 which prevents displacement of the member 6 when the same has assumed its normal position.

The locking member 17 is mounted on a pivot 18 and is provided with a rearward projection 19, which limits the upward movement of the same by coming in contact with the member 11, as will be readily understood.

The rigid side and top of the stanchion is strengthened by a brace 20 which is connected to the side 5 by an upright 21, and the upper end of the brace 20 is connected with a rod 22, which is connected with the swivel 2. This brace insures the rigidity and durability of the side and top of the stanchion.

It will be seen that my stanchion is simple, inexpensive, and durable, and that the same is capable of continued use with a minimum wear.

In view of the patents to Torhorst, No. 884,962; Porter, #548,928; Ferris, #786,350; Overacker, #849,264; Rice, #673,288; Crumb, #909,760; Miley, No. 933,775; Miner, #417,265; and the patent to Perry, Patent No. 983,761, the inventor is well aware that stanchions have been heretofore devised and patented, therefore the patentee is not broadly claiming a stanchion, nor is he claiming any of the particular arrangement as embodied in said foregoing enumerated patents, but it is to be noted that he is claiming a simple, efficient, practical and desirable detail structure, as definitely, and specifically defined in the appended claim. The U-shaped looped guide which is fastened to the top member and has its sides connected integrally around the upper end of one of the side members of the stanchion, together with the ararngement of the U- shaped locking device (which is provided with a projection on one of its side portions to coöperate with one of the sides of the looped guide to limit the locking device in its upward movement) constitutes combined means to strengthen the relation between the top and one of the side members and to lend rigidity to the structure. The locking device has at its free end an upturned portion to be contacted with by the free end of the movable side member to automatically raise the locking device to permit it to arch about the free end of the movable side member. The foregoing features of construction are those that are specifically and definitely defined in the claim.

What is claimed is:

A stanchion comprising, a vertical side member, bottom and top members, an elongated looped guide having its side secured to the top member below the upper surface thereof and to the side member, the sides of the guide being integrally connected around the upper end of the side member, a movable side member pivoted to the bottom member and having its upper end guided between the sides of the looped guide, a U-shaped locking device havings its sides at corresponding opposite ends pivoted to the upper protruding parts of the top member and normally resting on the edges of the sides of the looped guide, said locking device having an upturned free end, a tension element connecting said side members acting to automatically close the pivoted side member throwing its free end against the upturned portion of the locking device to raise the same to permit it to arch about the upper guided free end of the pivoted side member, and a projection forming an integral part of one of the sides of the locking device and adapted to coöperate with one of the sides of the looped guide to limit the locking device in its upward movement, the arrangement of the U-shaped locking device and the looped guide constituting combined means to strengthen the relation between the top member and the first side member and lend rigidity to the structure.

In testimony whereof I have signed my name to this specification in the presence of two subscribing witnesses.

JOHN GEORGE EGGARS.

Witnesses:
JOHN SAMMANS,
GEORGE SAMMANS.

Copies of this patent may be obtained for five cents each, by addressing the " Commissioner of Patents, Washington, D. C."